July 8, 1930.  W. P. SCHLEMMER  1,770,253
POWER TAKE-OFF RACK
Filed July 19, 1928
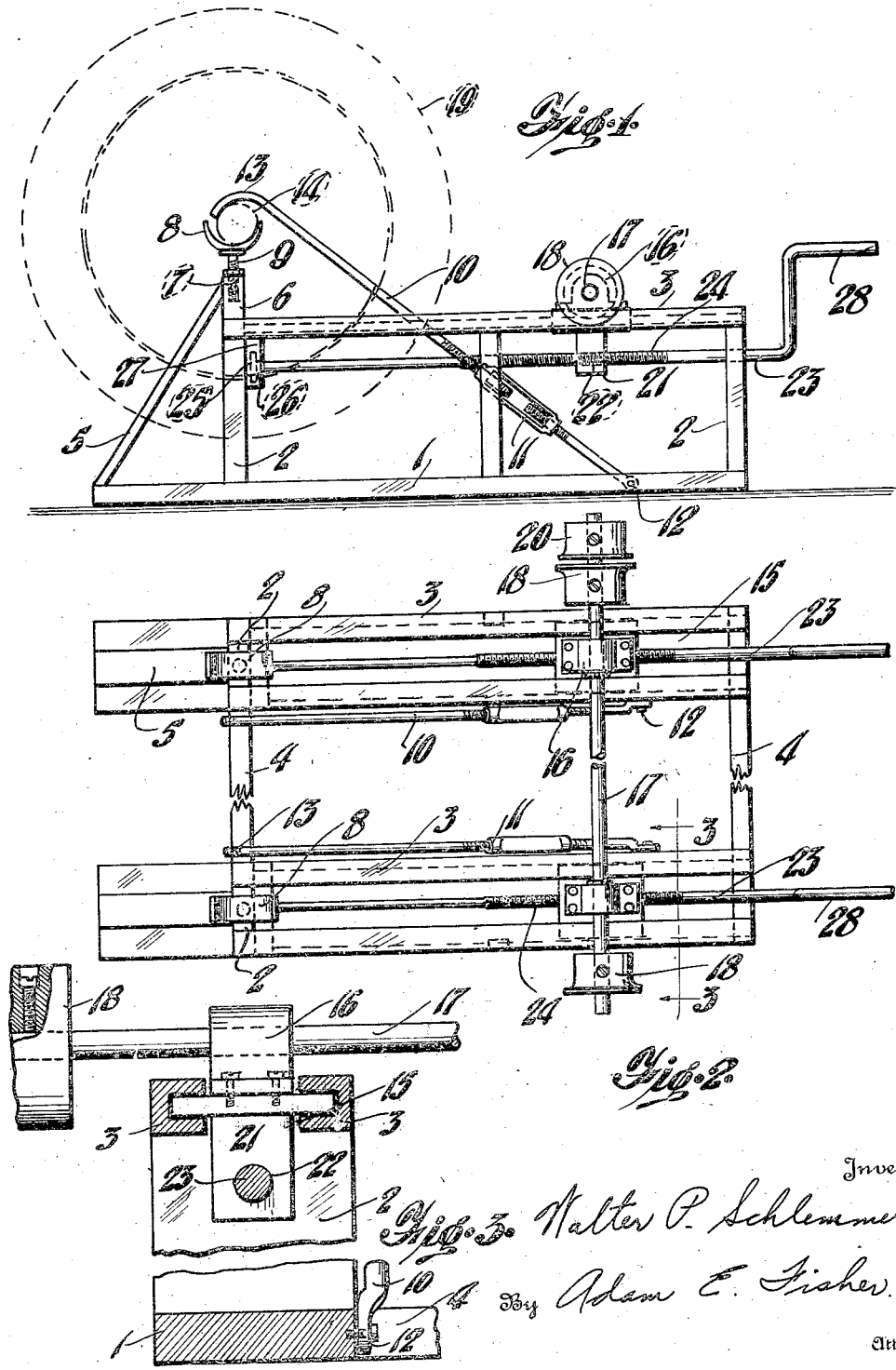

Patented July 8, 1930

1,770,253

UNITED STATES PATENT OFFICE

WALTER P. SCHLEMMER, OF FULTS, ILLINOIS

POWER TAKE-OFF RACK

Application filed July 19, 1928. Serial No. 293,902.

This invention is a power take-off rack for so that the power of those wheels may be utilized for driving machinery.

The object of the invention is to provide a relatively simple and durable rack for supporting the rear axle of an automobile, the same including adjusted axle standards and adjusted power shaft journal boxes.

In the drawing

Figure 1 is a side elevation showing the invention mounted in position for use, a rear wheel of the automobile being shown in dotted lines;

Figure 2 is a top plan view of the device alone, a mid-section thereof being broken away;

Figure 3 is an enlarged sectional detail on the line 3—3 of Figure 2.

The invention comprises a suitable rigid frame made up of the sills 1, posts 2, top rails 3, cross bars 4 and braces 5, all rigidly tied together. The rear posts 2 are extended upwardly as shown at 6, and are tapped out longitudinally to form threaded sockets 7. Axle supports 8 are provided and have the threaded standards 9 seated in the sockets 7. Sectional guy-rods 10, connected by turnbuckles 11, have their lower ends pinned at 12 to the sills 1, while their upper ends are hooked over, as shown at 13, and so adapted to releasably engage the upper side of the axle 14 of an automobile (not shown). It will be noted that there are four top rails 3, the same being arranged in pairs at each side of the frame, so as to form guide-ways 15. Journal boxes 16 are slidably mounted in these guide-ways, and a power take-off shaft 17 is journaled through these boxes, the same having flanged pulleys 18 for frictionally engaging the tires 19 of the wheel. A power take-off pulley 20 is also mounted upon one extremity of the said shaft 17. The journal boxes 16 are provided with depending lugs 21 tapped at 22, and adjustment rods 23, having the medial threaded portions 24, are passed through these lugs with the portions 24 in threaded engagement with the same. The rear ends of the rods 24 carry the anchor disks 25 which are journaled within offset sockets 26 formed in anchor lugs 27 secured to the frame. Thus by turning the cranks 28 at the outer ends of the rods 23, the pulleys 18 may be readily moved longitudinally relative to the guide-ways 15, and may be readily brought into contact with the tires 19, so as to be rotated and driven thereby. Power is then taken off through the pulley 20. The standards 9 are first adjusted to the elevation required, and the axle 14 is then jacked up off the ground, after which the frame and standards are shoved in under the axle, and the jack (not shown) is removed, leaving the axle 14 raised upon the supports 8.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

I claim:

In a device of the kind described, a frame including ground sills, posts on the sills, top rails on the posts, laterally connecting cross bars, and frontal braces, the said frontal braces angularly connecting the top of the frame with the said sills, axle supports upon the top of the forward end of the frame, and rearwardly disposed sectional guy rods with turnbuckles adjustably connecting the sections of the guy rods, the lower sections of the said guy rods being pivoted to the said sills in opposition to the said frontal braces, and the upper sections of the guy rods being hooked and adapted to engage an axle upon the axle supports for clamping the same firmly to the frame.

In testimony whereof I affix my signature.

WALTER P. SCHLEMMER.